UNITED STATES PATENT OFFICE.

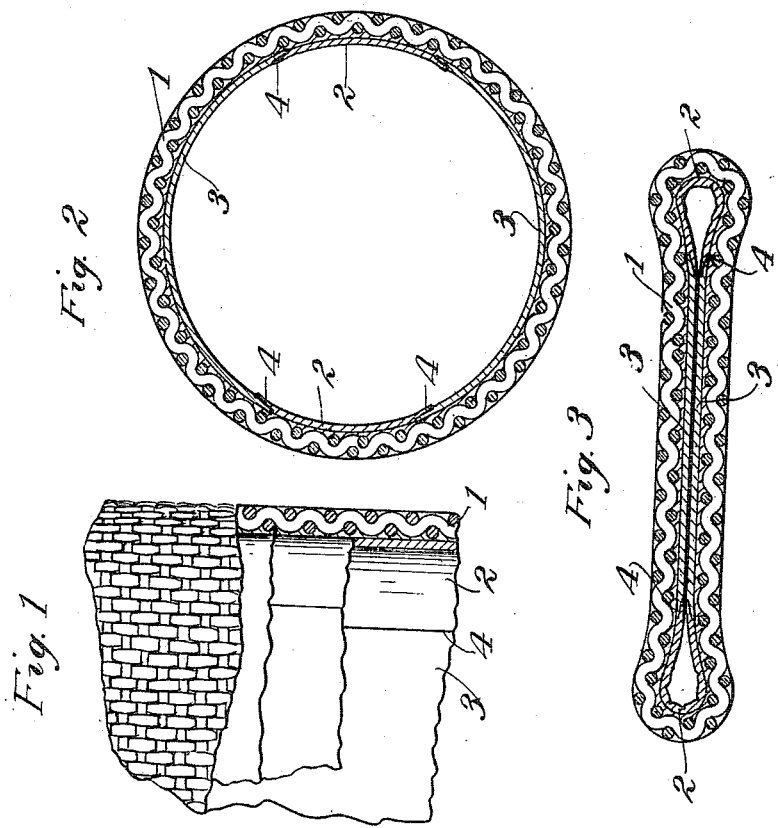
C. M. C. BAIRD.
HOSE CONSTRUCTION.
APPLICATION FILED JAN. 6, 1910.
979,408.
Patented Dec. 27, 1910.

CASSIUS M. CLAY BAIRD, OF EVANSTON, ILLINOIS.

HOSE CONSTRUCTION.

979,408. Specification of Letters Patent. Patented Dec. 27, 1910.

Application filed January 6, 1910. Serial No. 536,674.

*To all whom it may concern:*

Be it known that I, CASSIUS M. CLAY BAIRD, a citizen of the United States of America, and a resident of Evanston, county of Cook, State of Illinois, have invented certain new and useful Improvements in Hose Constructions, of which the following is a specification.

The main objects of this invention are to provide an improved construction for fire and mill hose of the type which is flat when empty, and to provide an improved form of rubber lining for such hose whereby the cost of manufacture may be greatly reduced without sacrificing the durability, and whereby greater durability can be obtained than is commercially practicable with similar hose of usual construction.

As usually constructed, fire hose comprises a flexible but tough casing, usually of woven cotton fabric and having a lining of rubber cemented to the inner surface thereof. In all grades of hose the life of the hose depends upon the life of the rubber lining and the casing is generally still in excellent condition when the hose has to be discarded on account of the leakage of the lining. The life of the hose is therefore increased by increasing the quality of the lining and it is the cost of the lining which is the principal factor in determining the cost of the hose.

In the manufacture of cotton or linen covered fire or mill hose of the type to which this invention particularly relates, it is customary to crease the casing at opposite sides so that the hose will assume a flat form for compact storage when empty. On account of the creasing of the lining at the points where the casing of the hose is creased, the lining fails at these points. It is a well known fact that when hose has become worn out, it is only the creased parts of the lining which have failed while the parts of the lining which lie between the creases are still fit for long continued service. This is true when the lining is made of the cheapest quality of rubber that is fit for the purpose, as well as when it is made of the best quality. A comparatively cheap quality of rubber is therefore amply good for use as a lining of the parts of the hose between the creases. A high degree of elasticity is needed in the lining only at the points where the creases take place, and between these points the lining need have only enough elasticity to allow the usual stretching of the casing when the hose is full of water under pressure.

In the usual process of manufacture, the final step in the curing or vulcanization of the rubber lining consists in filling the hose with steam under high pressure and maintaining such pressure for a suitable period of time. This gives the lining and the cement a permanent form and consistency. The normal shape of the lining is therefore circular, and when the hose is flattened, the parts of the lining adjacent to the creases are compressed by the jacket and puckered, and are subjected to severe strain. Furthermore, this strain is continued during the entire time when the hose is not in use, which is the greater part of the life of the hose. Rubber hardens and loses its resiliency under strain, and the lining therefore assumes a permanent form which is too small for the jacket. When the hose is filled, the compressed parts of the lining must stretch back to their original enlarged circular form. If it is no longer sufficiently elastic, it cracks, and the hose becomes worthless. By the present invention, the lining is made of composite character, to insure that it will contain the very best quality of rubber where the strain and deterioration take place, whereas, it will contain a less expensive, though amply durable rubber between these places. It will be seen that the use of expensive high-grade rubber at places where it is not necessary amounts to waste and useless expense.

A specific embodiment of this invention is illustrated in the accompanying drawings, in which:—

Figure 1 is a fragmentary view, partly broken away and partly sectional, of a fire hose constructed according to this invention. Fig. 2 is a transverse section of the same, showing the circular form which is assumed when the hose is full of water. Fig. 3 is a transverse section corresponding to Fig. 2, but showing the hose flattened as when it is empty.

In the construction shown, the casing 1 is of tough flexible material, as for instance, cotton or linen fabric, and the lining is built up of longitudinal strips or segments 2 and 3 secured together at their adjacent edges to form a continuous lining for the casing. The joints between the adjacent edges of the sections 2 and 3 are preferably scarfed or lap joints. The lining may be secured within the casing in any usual way, as for instance, by means of rubber cement which is vulcanized after the lining is in position so that the various segments of the lining, as well as the cement are practically integral with each other.

The segments 2 of the lining may be made from the finest grade of para gum, whereas, the segments 3 may be made of a rubber composition having comparatively little resiliency. It is found in practice as far as the segments 3 are concerned that the poorest grade of rubber which is used for the purpose is able to withstand the ordinary bending of the hose and the strains to which it is subjected when the hose is filled with water. It will be seen from a comparison of Figs. 2 and 3, that but slight bending of the segments 3 is caused by filling or emptying the hose, whereas the strains upon the segments 2 are severe, on account of the compression and puckering which take place when the casing is flattened as is shown in Fig. 3, and the stretching of the casing which is required to bring it back to its normal condition, as shown in Fig. 2.

Although but one specific embodiment of this invention is herein shown and described, it will be understood that some of the details of the construction shown may be altered or omitted, within the scope of the following claims, without departing from the spirit of this invention.

The term "creases" as herein used in the claims is intended to mean the lines, or the portions of the casing of the hose, along which it bends when it assumes its normal flattened condition on being emptied. On account of the thickness of the casing, this is usually not a sharp angle in the casing, but is a bend of sharp curvature as compared with the curvature of the casing when filled.

I claim:—

1. A hose, comprising a flexible casing adapted to be creased at opposite sides so as to lie flat when empty, a flexible lining secured within said casing, said lining comprising segments of rubber at the parts which are adjacent to the creases in the casing, and segments of less elastic material interposed between said first named segments.

2. A hose comprising a flexible casing and a rubber lining, said casing being adapted to be creased at opposite sides so as to lie flat when empty, and said lining comprising elastic segments covering and extending substantially throughout the creased parts of the casing and segments of less elasticity between said first named segments.

3. A hose, comprising a flexible casing adapted to be creased at opposite sides so as to lie flat when empty, a flexible lining secured within said casing, said lining being formed of a plurality of grades of rubber, the better grade being located at the creases of the casing.

4. A hose, comprising a flexible casing adapted to be creased at opposite sides so as to lie flat when empty, a flexible lining secured within said casing, said lining being of composite construction and comprising parts at the creases of the casing which are more elastic than the parts between the creases.

Signed at Chicago this 31st day of December 1909.

CASSIUS M. CLAY BAIRD.

Witnesses:
   EUGENE A. RUMMLER,
   MARY M. DILLMAN.